UNITED STATES PATENT OFFICE.

MIECZYSLAW v. WIERUSZ-KOWALSKI, OF LEIPZIG, GERMANY, ASSIGNOR, BY MESNE ASSIGNMENTS, TO THE CHEMICAL FOUNDATION, INC., A CORPORATION OF DELAWARE.

PROCESSES OF SYSTEMATICALLY SULFURATING THE JUICES OBTAINED DURING THE MANUFACTURE OF SUGAR.

1,399,533. Specification of Letters Patent. Patented Dec. 6, 1921.

No Drawing. Application filed July 29, 1916. Serial No. 112,139.

*To all whom it may concern:*

Be it known that I, Dr. MIECZYSLAW VON WIERUSZ-KOWALSKI, a citizen of the Austrian Empire, and resident of Liepzig, Germany, have invented certain new and useful Improvements in Processes of Systematically Sulfurating the Juices Obtained During the Manufacture of Sugar, of which the following is a specification.

My invention relates to the treatment of sugar juices, and has for its object to improve the treatment with sulfurous acid or other sulfurating agent in such a manner as to greatly facilitate the separation of the impurities by filtration and to reduce the cost of the operation, and the time required.

I attain this end as follows:—The juice issuing from the diffusion battery is sulfurated cold, *i. e.* at a temperature below 50° C., until a degree of acidity is obtained at which 100 c. cm. of the sulfurated juice are neutralized with from 50 to 100 c. cm. of a $\frac{1}{28}$ standard solution of lime according to the nature of the juice. The juice is thereafter mixed with lime or milk of lime until an alkalinity of from 0.06 to 0.14 grams per liter, according to the nature of the juice, is obtained, and is then passed through preheaters to the filter-presses. The juice thus treated filters quite readily through filter-presses. Hard cakes are obtained which may be readily sweetened off.

The filtered juice thus preliminarily defecated is then treated with the requisite quantity of lime in a hot defecation process of the customary character, and then further treated in the usual way, that is to say, worked up into masse cuite, etc.

Should it be desirable in some cases, a thin layer of a saturation scum may be deposited on the filter cloths before the preliminarily defecated juices are filtered. This is readily accomplished by filtering off a small quantity of a thoroughly saturated juice, or of the saturation scum from which the sweet stuff is to be removed. This will rarely be necessary, however, and only in cases of imperfect sulfuration, or preliminary defecation. When the process is properly carried out, two precipitates, *i. e.* that from the sulfuration and that from the cold preliminary defecation, may be quite readily filtered together and have the sweet stuff removed from them.

In order to introduce as little as possible of the sweet water into the manufacturing process it is preferable to remove the sweet stuff from the scum, or cake of the preliminary defecation process with the saturation scum, at a time when the filter-presses begin to work with difficulty; that is to say, when they are almost full to completely fill them with saturation scum stirred up with water. The two precipitates which cannot be filtered off by themselves can be readily filtered off together in the above described manner.

That the albuminous substances contained in the precipitate undergo no decomposition when passing through the preheater is evidenced by the fact that the juices emit no odor of ammonia, and that the resulting precipitate with the small excess of lime amounting to from 0.06 to 0.14 grams per liter is not redissolved is shown by the fact that the juices have the same degree of purity after passing through the preheaters as before. That the precipitate from the preliminary defecation contains the largest part of the albuminous substances in the juice is proved by the fact that it contains 3% upward of nitrogen, and that in the following hot defecation of the filtered juice only an exceedingly weak scarcely perceptible odor of ammonia is emitted by the juice.

By employing this method of working during the last few days of the 1913 campaign, namely after the 20th of December when the beet was greatly altered and lixiviated, I obtained with 1.3% lime, from a diffusion juice of 87.20 degree of purity (d. p.) a thick juice of up to 95.38, and I could drive the first saturation up to the limits of a second, *i. e.* up to 0.04 and 0.03 alkalinity (phenolphthalein). In the customary working process and with a consumption of lime amounting to 3% the same juices have yielded a thick juice of 92–92.5 d. p. This juice was colored much more deeply and had 1.07 g. salts of lime per liter, whereas when the process forming the subject-matter of this invention was employed the thick juices had at most only 0.17 g. and were thus almost free from salts of lime. Also a very valuable fertilizer was obtained because the scum from the preliminary defecation contained about 8% phosphoric acid ($P_2O_5$) and about 3% nitrogen.

My tests made after January 1, 1915 gave the following results:—

The diffusion juice of 86.10 d. p. when treated by the method disclosed in the German Patent 138693 and with a consumption of lime amounting to 1.8% yielded a saturation juice of 90–90.5 d. p., while the same diffusion juice treated by the method according to this invention with one single saturation yielded a saturation juice of (a) 93.01 d. p. saturated to 0.04 phenolphthalein alkalinity (b) 92.97 d. p. saturated to 0.00 phenolphthalein alkalinity (c) 93.42 d. p. saturated to 0.02 phenolphthalein alkalinity with a total consumption of lime of 1.4%. The saturation juices were almost as clear as water.

The color and purity of the supersaturated juice b were equal to those of the other juices a and c, a proof that when the precipitate arising from the preliminary defecation was filtered off the supersaturation exercised no influence on either the purity or the color of the juice.

The diffusion water may also be purified, and filtered in the same manner as the raw juices and may be further used in the manufacturing process. The sugar contained in this water, and which would otherwise be lost, may thus be recovered and the diffusion water rendered usable again. This is of great importance, particularly, for factories having a deficient water supply.

I have found that much better results are obtained if the sulfurating treatment is applied to thick or comparatively viscous juices than if the juices are thin. At the same time, however, thick sugar juices as generally obtained are very pure, and for this reason liable to inversion if the treatment with acid is continued to the point required by my process. For this reason, another feature of my invention consists in producing a thick juice of comparatively low purity. I may remark that it is not suitable to obtain this result by the addition of mother-liquor to the pure thick juice, because such mother-liquors are relatively highly colored and very viscous, and because the non-sugars introduced with mother-liquor unfavorably influence the crystallization of the sugar. The degree of purity of the thick juices may be reduced, however, without adding any non-sugar in a quite different natural way, and all injurious effects attendant to the addition of mother-liquor are avoided. This is done according to my invention by defecating a predetermined quantity of crystal sugar, as by partial crystallization of the first strike, through the introduction of a process or step which may be termed the process or step of producing the preliminary masse cuite.

As soon as the crystal nucleii of sufficient size have been formed under vacuum, the unripe masse cuite, i. e. the preliminary masse cuite, is centrifuged at the same temperature as that which it had in the vacuum and the mother-liquors thereby obtained, and which have fallen from 94 d. p. of the masse cuite to 87 d. p. for example, are subjected afresh to sulfuration which may now be continued, without any danger of inversion, to acidity. After having been filtered the preliminary masse cuite mother-liquors thus treated are boiled to the first product and treated further in the usual manner.

Of course the neutral and indeed acid fillmasses are neutralized much more easily and thus yield a much greater output (about 0.5% calculated with reference to beet).

The mother-liquors from the preliminary masse cuite may be worked up in the same manner into the second product after they have been sulfurated. Working in this manner I have obtained from a mother-liquor from the preliminary masse cuite which had 78.55 d. p., a total output of 53.56% crystal sugar. This crystal sugar, which polarized 93.2°, had 1.92% ash.

By way of example I may state that a 53.56% sugar polarizing 93.2°=49.92% of the 100% sugar; and since a mother-liquor of d. p.=78.55 yields with ordinary good work, at most about 41% of the 100% sugar; the extra yield amounts to ±9% white sugar from the mother-liquor from the preliminary masse cuite when calculated with reference to beet this is equal to:—

Preliminary masse cuite from the beet _____ ±17.5%
White sugar from the preliminary masse cuite _____ ±66.0%

$$\frac{66 \times 17.5}{100} = 11.55\% \text{ accordingly.}$$

First mother-liquor calculated for beet _____ ±5.95%
The extra yield thus amounts to—

$$\frac{5.95 \times 9}{100} = 0.5355\% \text{ polarization sugar.}$$

The subject-matter of the invention accordingly is, first, neither the known sulfuration of the raw juice, nor the likewise known cold preliminary defecation effected with the correct quantity of lime, but a suitable combination of these two known processes which will enable the precipitates produced during these two processes to be filtered, thereby supplying a long felt want, and second, the subject-matter of the invention is the production of a partial crystallization of the products which enables me to obtain thorough sulfuration and indeed acid boiling. When employed in practice the above described systematic sulfuration has the following advantages:—

1. An increase of 2 to 3 degrees in the purity of the juices.
2. A viscosity lower by about 50%.
3. About 70% less color.
4. Formation of salts of lime reduced to a minimum.
5. About 1.5% saving of lime.
6. A saving of coal of about 1% (calculated with reference to beet) in factories using milk of lime.
7. The possibility of working with only one saturation.
8. More rapid work; about 10% shorter campaign.
9. Very considerable diminution of incrustation in the vaporizing apparatus.
10. The possibility of repeatedly using the diffusion water.
11. Improved boiling, easier crystallization having an increased yield and easier centrifuging.
12. A reduction in the loss of sugar which is particularly considerable in sugar factories working with rapperies.
13. An increase of about 0.8–1% in the yield of sugar (calculated with reference to beet).
14. A valuable fertilizer (about 1% calculated with reference to beet).

I claim:—

1. The process of treating raw sugar juices which comprises admitting sulfur dioxid to the juice while cold until an acid reaction is obtained, neutralizing with a solution of calcium hydroxid, adding milk of lime to the unfiltered juice until a decided alkaline reaction is obtained, heating, filtering, adding lime to the filtrate thus obtained while hot, again filtering, and then working the filtrate up into masse cuite.

2. The process of treating raw sugar juices which comprises sulfurating said juices while cold to acidity, neutralizing with a solution of a hydroxid, rendering alkaline with milk of lime, heating, filtering, adding an alkali to the filtrate thus obtained while hot, again filtering and working the filtrate up into masse cuite.

In testimony, that I claim the foregoing as my invention, I have signed my name in presence of two subscribing witnesses.

Dr. MIECZYSLAW v. WIERUSZ-KOWALSKI.

Witnesses:
HENRY HASPER,
ALLEN F. JENNINGS.